May 6, 1952 W. W. GLEASON 2,595,840
SPRING ASSEMBLY FOR UPHOLSTERY
Filed April 23, 1949 3 Sheets-Sheet 1
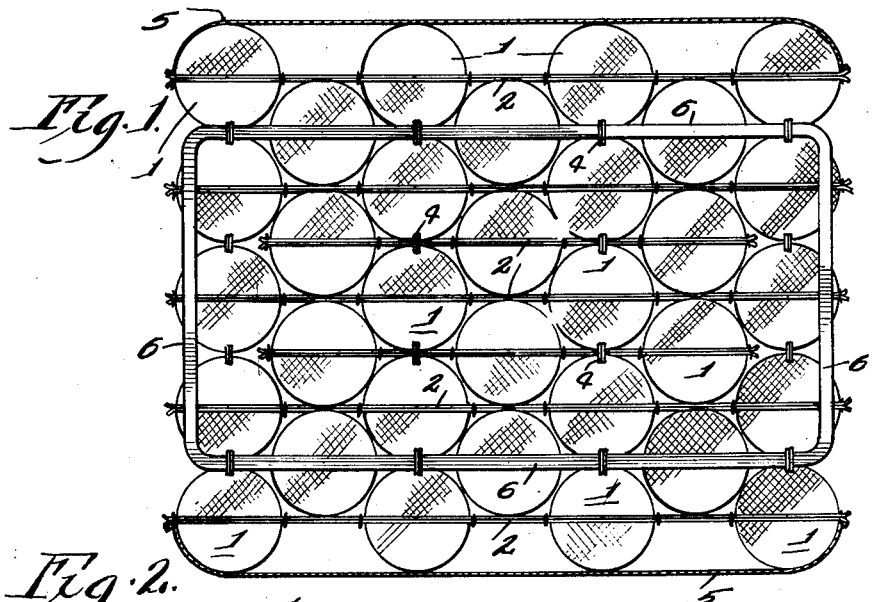
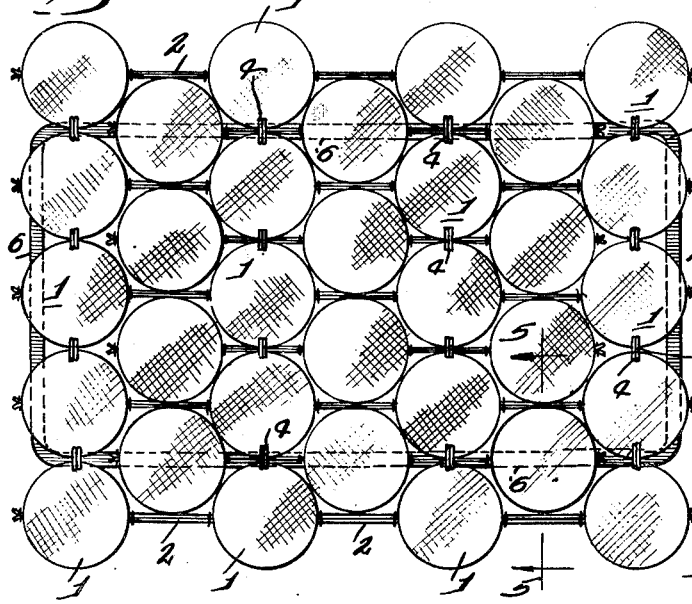
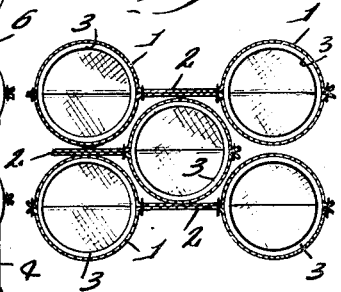
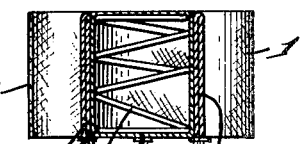
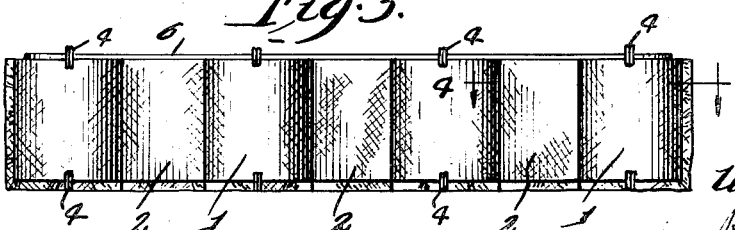
Inventor.
William W. Gleason
By Rudolph Wm Lotz
Attorney May 6, 1952 W. W. GLEASON 2,595,840
SPRING ASSEMBLY FOR UPHOLSTERY
Filed April 23, 1949 3 Sheets-Sheet 2
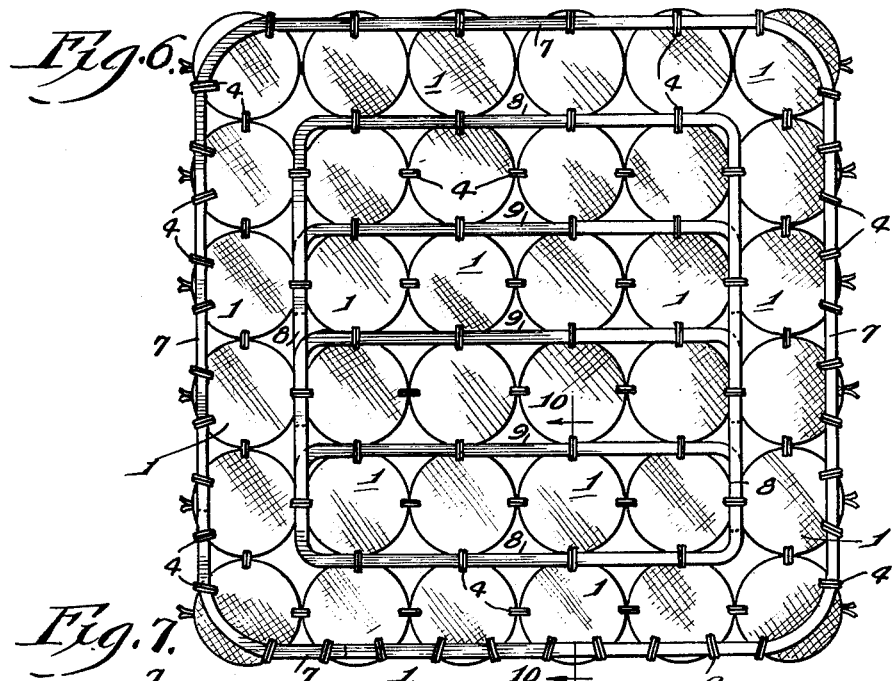
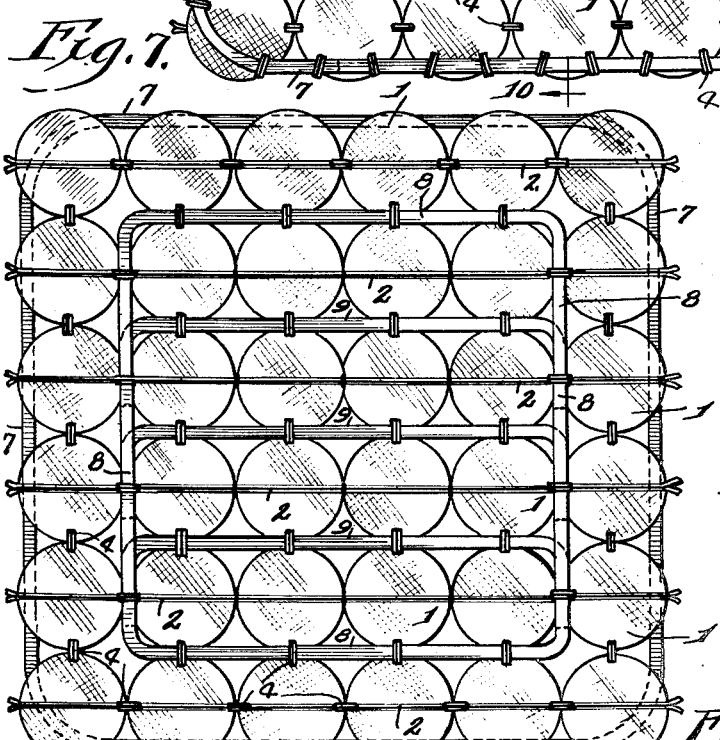
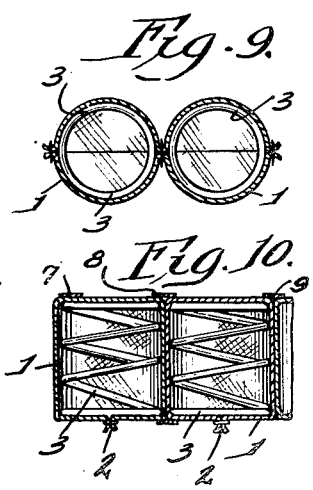
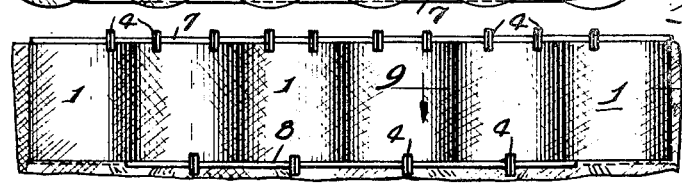
Inventor.
William W. Gleason.
By Rudolph Wm. Lotz
Attorney.

May 6, 1952 W. W. GLEASON 2,595,840
SPRING ASSEMBLY FOR UPHOLSTERY
Filed April 23, 1949 3 Sheets-Sheet 3

Inventor
William W. Gleason
By Rudolph Wm Lotz
Attorneys

Patented May 6, 1952

2,595,840

UNITED STATES PATENT OFFICE 2,595,840

SPRING ASSEMBLY FOR UPHOLSTERY

William W. Gleason, Chicago, Ill., assignor to Nachman Corporation, Chicago, Ill., a corporation of Illinois Application April 23, 1949, Serial No. 89,200

12 Claims. (Cl. 5—251)

This invention relates to improvements in what is known to the upholstery art as the Marshall type of spring assemblies wherein helical springs are encased in fabric pockets formed in chains of predetermined lengths—the springs used being of the unknotted type.

The main object of the present invention is to provide spring assemblies of the said Marshall type which will not yield substantially to lateral pressures imposed upon the peripheral edges of the assembly, and, further so, to connect adjacent springs and the fabric casings thereof with each other in such manner and by such means that the terminal coils of said springs cannot become overlapped and thus impart stresses upon the casings thereof which operate to wear through said casings and thus cause the springs to become overlapped and produce noise due to metal contacts.

A further object of the invention is to include in the said assemblies, devices which are secured to selected springs thereof to effect further resistances to the aforesaid lateral pressures upon the peripheral edges of the assembly and also to provide further, the advantages made clear in the following specification.

In the accompanying drawings illustrating exemplary embodiments of the invention—

Fig. 1 is a fragmentary top plan view of a spring assembly constructed in accordance with the invention.

Fig. 2 is a fragmentary bottom plan view of the same.

Fig. 3 is an end elevation of the same.

Fig. 4 is a fragmentary detail plan view of the same.

Fig. 5 is a fragmentary, detail, vertical, sectional view of the same.

Figs. 6 and 7 are, respectively, top and bottom plan views of a modified form of embodiment of the invention.

Fig. 8 is an end elevation of the same.

Fig. 9 is a fragmentary plan view of the same.

Fig. 10 is a fragmentary, detail, vertical, sectional view of the same.

Figure 11:
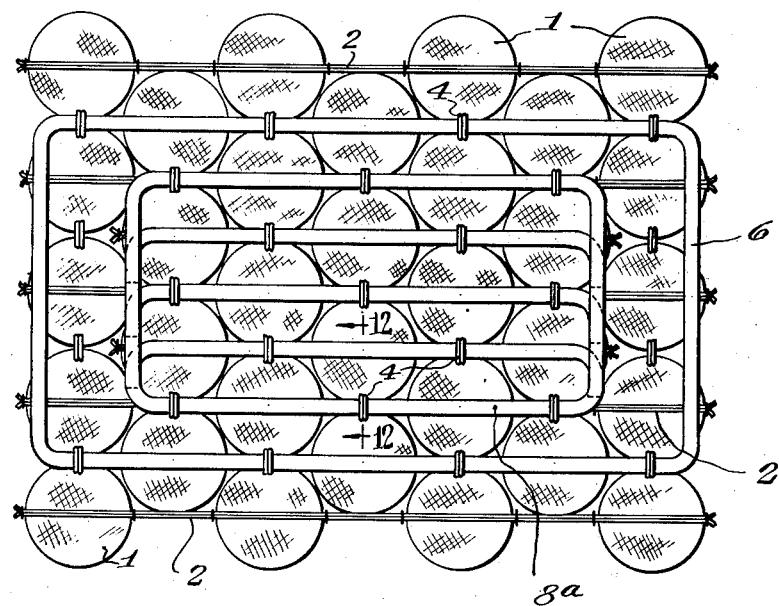
Fig. 11 is a top plan view of a further embodiment of my invention.
Figure 12:
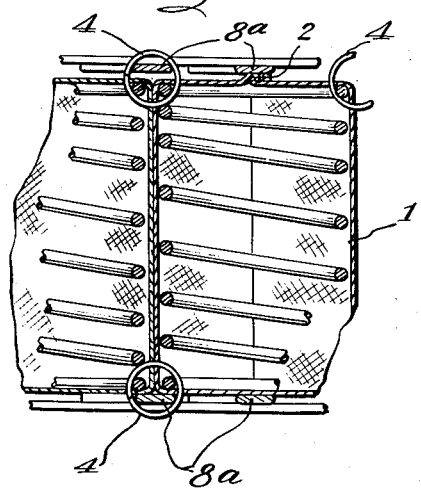
Fig. 12 is a fragmentary, vertical sectional view taken on the line 12—12 of Fig. 11.

Marshall type spring assemblies of conventional type are composed of rows of articulate fabric casings which are formed by folding a strip of fabric of any desired length and width midway between its side edges and passing stitch chains through the folded strip perpendicularly to its longitudinal edges at equally spaced apart points to provide a series of pockets to receive compressed helical springs.

The spaces between said stitch chains is of length equal to one-half the circumference of a cylinder of the diameter of the springs to be inserted into the pockets of the strip or slightly less than the latter, and the depth of said pockets is less than the length of said springs.

The latter, in lightly compressed state, are inserted edgewise into said pockets and the open ends of the latter are then closed by a continuous stitch chain disposed parallel with the side edges of the fabric strip, the springs in the casings being then manipulated to turn them through an arc of ninety degrees and they then expand to as full length as the depth of the pockets will permit and completely fill and distend said pockets.

In this instance, the spring-filled pockets of the articulate rows of casings shown in Figs. 6 to 10 are of the standard Marshall type, but the rows of said spring-filled casings and the springs contained therein are joined by means of short closely wound helical tie-wires which are passed through corner portions of the casings and into encircling relation of springs of two contiguous rows to join the latter. No patentable novelty is claimed, per se, for the substitution of said tie-wires for the cords used in the Standard Marshall type assemblies nor other substitutes for same heretofore used.

The helical springs commonly used are of the unknotted type, and due to their partially compressed state, the terminals of end-coils of the springs meet the next inner convolution thereof at one point so that no such terminal of an end-coil will project outwardly beyond the remainder of said coil.

During use of said standard Marshall type assemblies, in spring-filled upholstery units, the alternate compression and expansion of the springs tend to cause them to rotate slightly and thus it happens, occasionally, that an end-coil of a spring becomes disengaged from the fastening cord or other fastening device, and in time the terminal of one or both end-coils of a spring projects through one or both end walls of a casing and permits said spring to expand and also pass through the fibrous batt and the cover ticking of the upholstery unit with obviously bad results.

Sometimes, also, under foregoing conditions, one or a small group of the springs become canted and thus form deep hollows in a mattress or seat cushion.

Hence important objects of the instant invention is to provide means whereby the foregoing happenings are eliminated by the addition of preventive structures added to the assembly; one of these objects being to distribute loads imposed upon the latter over a far greater area of the assembly than is otherwise possible, and thus prevent what is known as "cupping," the same, and, second, to prevent the canting of springs and elimination of the aforesaid results thereof.

In the embodiment of the invention shown in Figs. 1 to 5, the fabric casings 1 for springs 3 are also produced in articulate chains in the same manner as those of the embodiment of Figs. 6 to 10, except that they are spaced equally from each other and connected with each other by the fabric webs 2, these chains of casings 1 and webs 2 being formed by folding a strip of fabric and then passing two stitch chains through the same in place of one and spacing the same apart a distance equal to the length of the webs 2 with alternate stitch chains spaced apart as in the instance of the articulate chains of Figs. 6 to 10.

The chains of casings 1 are disposed in parallel relation with each other so that the casings 1 of all strips become disposed in staggered relation to each other and opposed to the webs 2 of next adjacent chains and thus nested in the hollows bordered by casings 1 of said next adjacent rows.

The helical springs 3 are inserted into the casing in the same manner as described above and alternate chains of said casings are then connected with each other by means of short helical tie-wires 4 which pass through corners of the casings 1 and encircle the terminal coils or end convolutions of springs 3 of contacting or tangent casings 1. These tie-wires 4 also pass through the webs 2 of the intermediate chains to complete a spring assembly of any desired dimension.

The said assembly presents the great advantage of including more springs per square foot of area than is true of the assembly of Figs. 6 and 7 and which, therefore, has a greater load carrying capacity than the latter, but presents one disadvantage in that, laterally, the rows of spring-filled casings are composed of alternate rows of five and four, respectively, in the instance illustrated, so that marginally of the assembly, the terminal springs of the rows of five spring-filled casings each, four of said marginal springs project half-way farther outwardly from what may be termed the normal and most desirable side edges of an assembly and thus leave hollows to be filled by padding, or closed at their mouths by a boxing strip 5 as indicated in cross section in Fig. 1. The latter may be and preferably are, equipped with side edge flanges not shown to overlap and be secured to the marginal casings or the webs 2, parts of which pass over the stitch-closed mouth of the casings 1.

This disadvantage of the structure of Figs. 1 to 5 is compensated for, in large part, at least, by the fact that the free spaces bordered by casings 1 are of appreciably smaller area than those of the assembly of Figs. 6 to 10 and are bridged by the webs 2 and thus prevent padding material from entering said free spaces to any appreciable degree.

In all assemblies composed of standard Marshall type articulate casings, the marginal springs are subjected to more or less pressure laterally, particularly in seat cushions.

Such pressures are imposed first by the boxing strips of casings of mattresses and cushions and, as to the latter, by occupants of seating furniture, especially in instances wherein the cushions are longer than short persons' measurements from back to knee joints or calves.

Consequently, it has become common practice to secure metallic border frames to such assemblies composed of flat resilient wire or round wire, as shown in Figs. 6 and 7.

In Figs. 1 and 2, a flat wire frame 6 is mounted upon the assembly with its end-rails disposed with outermost edges of same disposed substantially tangentially of the outermost portions of the front and rear spring-filled casings 1 of the structure, but with side rails disposed over the axes and webs 2 of the casings 1 of the row of springs disposed next inwardly of the marginal springs.

In the embodiment of Figs. 6 and 7, the border frame 7 may be eliminated and only the framed structure composed of a marginal flat wire frame 8 and a plurality of parallel flat cross strips 9, all composed of highly resilient metal, may be used alone or conjointly with said border frame.

The marginal frame 8 has straight sides and ends and rounded corners. These marginal frames may be either rectangular as shown in Figs. 1 and 2 or a square as shown in Figs. 6 and 7, and may be provided with cross strips 9 as shown in the latter figures, or these cross strips may be omitted as shown in Figs. 1 and 2. The straight sides and ends of these frames are hereinafter referred to as rails.

The frame member 8 is of such size and shape that its side and end-rails overlie the meeting edge portions or aligned points of tangency of the marginal and next inwardly disposed spring-filled casings of the assembly and the frame 8 is secured in place by short helical tie-wires 4 which encircle said rails and the end-coils or terminal convolutions of the springs at meeting or tangent points of casings 1 of the assembly so overlain.

The cross strips 9 are parallel, preferably, with the side rails of the frame and are spaced equally from the latter and each other so that they overlie and are secured by tie-wires 4 to the springs of meeting casings 1, the same as said frame member 8.

The structure 8—9 operates only to distribute load upon the assembly over a greater number of springs than those which would be otherwise required to bear the load and, therefore, would form cupped hollows in the load bearing area of the assembly.

The frame 8 being secured to the marginal springs operates to prevent, to a sufficient degree, the crowding, aforesaid, together of the spring-filled casings of the assembly responsively to the aforesaid lateral pressures imposed upon the marginal springs, thus maintaining the assembly in shape and reducing wear upon the same.

In the instance of Figs. 1 and 2, the webs 2 also operate to reduce such wear.

Figure 13:
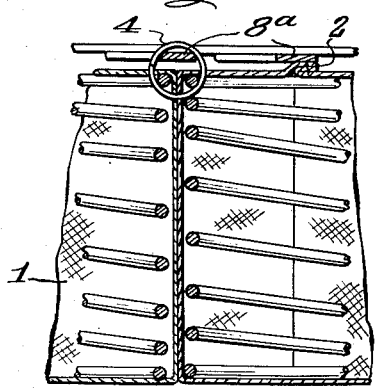
Fig. 13 is a view similar to Fig. 12 but showing a construction in which the lower frame is omitted.

In Fig. 11 I have shown a further embodiment of my invention in which a frame structure 8a corresponding to the structure 8—9 in all material respects has been added to both faces of an assembly like that shown in Figs. 1 and 2. Because of the large number of springs per square foot of an assembly like that shown in Figs. 1, 2, and 11, it may be desirable to add the frame structure 8a to only one face as indicated in Fig. 13.

I claim as my invention:

1. A spring assembly for upholstery comprising a series of parallel rows of fabric encased helical springs, the ends of said casings and the terminal coils of the springs contained therein being connected by helical tie-wires encircling the ends of said casings and said spring end-coils, a resilient frame composed of flat strip metal mounted upon one face of said assembly in overlapping relation to meeting end-coil portions of springs of a marginal row and an adjacent row and the casings thereof, and helical tie-wires encircling said frame and terminal portions of meeting points of certain of said casings and the terminal coils of two springs overlapped by said frame.

2. A spring assembly, according to claim 1, wherein the casings of the springs of each row are spaced apart equally, fabric webs disposed in the vertical plane of the axes of said casings connecting the casings of each row with each other and providing spaces within which spring-filled casings of adjacent rows are nested when the latter are disposed in staggered relation to an intermediate row of said spaced apart spring-filled casings.

3. A spring assembly for upholstery comprising a series of articulate chains of fabric casings containing helical springs and disposed in parallel relation to each other and in contact with each other, short helical tie-wires extending through terminal corner portions of said casings and in encircling relation to terminal coils of springs contained within said casings at points of contact of said casings with each other, metallic members composed of flat resilient metal strips and each including a rectangular frame and a series of strips spaced apart from center to center from each other and from a pair of rails of said frame, a distance equal to the diameter of the encased springs and secured at their ends to the other rails of said frame, all of the rails of said frame and the said interposed metal strips being disposed to overlap the points of contact of casings with each other, and helical tie-wires encircling the rails of said frame and said interposed metal strips thereof and extending through overlapped meeting points of said casings and encircling terminal coils of the springs contained therein to secure the latter to said metallic members.

4. A structure, according to claim 3, wherein the rails of said metallic member overlap the meeting points of the marginal springs of the assembly with the next inwardly disposed springs and helical tie-wires secure the same to the said marginal casings and contained springs to said next inwardly disposed casings and the springs contained therein.

5. A spring assembly for upholstery comprising a series of parallel rows of fabric encased helical springs, a resilient rectangular frame composed of flat strip metal mounted upon a face of said assembly and having rails in overlapping relation to meeting end-coil portions of springs of selected rows of said springs and the casings thereof, the larger cross-sectional dimension of said flat strip metal lying in a plane parallel to said face to provide horizontal rigidity and vertical flexibility, and tie means encircling said rails and terminal portions of meeting points of certain of said casings and the terminal coils of two springs overlapped by said rails.

6. A spring assembly for upholstery comprising a series of parallel rows of fabric encased helical springs, a resilient rectangular frame composed of flat strip metal mounted upon a face of said assembly and having rails in overlapping relation to meeting end-coil portions of springs of the marginal springs of the assembly and the next inwardly disposed springs, the larger cross-sectional dimension of said flat strip metal lying in a plane parallel to said face to provide horizontal rigidity and vertical flexibility, and tie means encircling said rails and terminal portions of meeting points of certain of said casings and the terminal coils of two springs overlapped by said rails.

7. A spring assembly for upholstery comprising a series of parallel rows of fabric encased helical springs, a resilient rectangular frame composed of flat strip metal mounted upon a face of said assembly and having all four rails in overlapping relation to meeting end-coil portions of springs of the marginal springs of the assembly and the next inwardly disposed springs, the larger cross-sectional dimension of said flat strip metal, lying in a plane parallel to said face to provide horizontal rigidity and vertical flexibility, and helical tie wires encircling said rails and terminal portions of meeting points of certain of said casings and the terminal coils of two springs overlapped by said rails.

8. A spring assembly for upholstery comprising a series of parallel rows of fabric encased helical springs, a resilient rectangular frame composed of flat strip metal mounted upon each face of said assembly, each frame having all four rails in overlapping relation to meeting end coil portions of the marginal springs of the assembly and the next inwardly disposed springs, a larger cross-sectional dimension of said flat strip metal lying in a plane parallel to said face, and tie means encircling said rails and terminal portions of meeting points of certain of said casings and the terminal coils of two springs overlapped by said rails.

9. A spring assembly for upholstery comprising a series of parallel rows of fabric encased helical springs, a resilient rectangular frame composed of flat strip metal mounted upon each face of said assembly, each frame having all four rails in overlapping relation to meeting end coil portions of the marginal springs of the assembly and the next inwardly disposed springs, a larger cross-sectional dimension of said flat strip metal lying in a plane parallel to said face, a series of intermediate strips parallel with each other and two rails of said frame and spaced from the latter and each other a distance from center to center equal to the diameter of said casing with said intermediate strips and frame rails disposed parallel with the rows of said casings and overlying the meeting points of casings of parallel rows and the connecting webs, and tie means encircling said rails and intermediate strips and terminal portions of meeting points of certain of said casings and the terminal coils of two springs overlapped by said rails and intermediate strips.

10. A spring assembly for upholstery comprising a series of parallel rows of fabric-encased helical springs, a resilient rectangular frame composed of flat strip metal mounted upon each face of said assembly, each frame having rails in overlapping relation to meeting end coil portions of the marginal springs of the assembly and the next inwardly disposed springs, a larger cross-sectional dimension of said flat strip metal lying in a plane parallel to said face, and tie wires encircling said rails and terminal portions of meeting points of certain of said casings and the terminal coils of two springs overlapped by said rails, each such tie wire encircling only a single pair of springs, the springs in each row being in substantially abutting relationship with each other.

11. A spring assembly for upholstery comprising a series of parallel rows of fabric-encased helical springs, a resilient rectangular frame composed of flat strip metal mounted upon a face of said assembly and having rails in overlapping relation to meeting end-coil portions of springs of selected rows of said springs and the casings thereof, the larger cross-sectional dimension of said flat strip metal lying in a plane parallel to said face to provide horizontal rigidity and vertical flexibility, and tie means encircling said rails and terminal portions of meeting points of certain of said casings and the terminal coils of two springs overlapped by said rails, each tie means encircling only a single pair of springs, at least one marginal row of springs having end coils substantially in the plane of said rectangular frame, said last named end coils being connected to each other along a center line of said marginal row and having outer edges free to move independently of each other in a substantially vertical direction.

12. A spring assembly for upholstery comprising a series of parallel rows of fabric-encased helical spring units each having an end convolution substantially tangent to the end convolution of an adjacent unit, separate individual tie-wires encircling the tangent portions of said end convolutions and thereby connecting adjacent units together, and a resilient frame composed of flat strip metal mounted flatwise on a face of said assembly in overlapping relation to the points of tangency aligned between certain of said rows and secured to said face by the adjacent tie-wires.

WILLIAM W. GLEASON.

REFERENCES CITED

The following references are of record in the file of this patent:

UNITED STATES PATENTS

| Number | Name | Date |
|---|---|---|
| 698,529 | Marshall | Apr. 29, 1902 |